(12) United States Patent
Zhou et al.

(10) Patent No.: US 12,279,333 B2
(45) Date of Patent: Apr. 15, 2025

(54) MULTIMEDIA BROADCAST MULTICAST SERVICE (MBMS) RECEIVING METHOD AND APPARATUS

(71) Applicant: DATANG MOBILE COMMUNICATIONS EQUIPMENT CO., LTD., Beijing (CN)

(72) Inventors: Rui Zhou, Beijing (CN); Dajun Zhang, Beijing (CN); Li Chen, Beijing (CN); Erlin Zeng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 388 days.

(21) Appl. No.: 17/790,509

(22) PCT Filed: Dec. 9, 2020

(86) PCT No.: PCT/CN2020/135052
§ 371 (c)(1),
(2) Date: Jul. 1, 2022

(87) PCT Pub. No.: WO2021/155710
PCT Pub. Date: Aug. 12, 2021

(65) Prior Publication Data
US 2023/0054043 A1     Feb. 23, 2023

(30) Foreign Application Priority Data

Feb. 3, 2020 (CN) .......................... 202010079057.0

(51) Int. Cl.
*H04W 76/40* (2018.01)
*H04W 4/06* (2009.01)

(52) U.S. Cl.
CPC ............. *H04W 76/40* (2018.02); *H04W 4/06* (2013.01)

(58) Field of Classification Search
CPC ......... H04W 4/06; H04W 4/08; H04W 76/10; H04W 76/15; H04W 76/16; H04W 76/19;
(Continued)

(56) References Cited

U.S. PATENT DOCUMENTS

| 2012/0155364 A1 | 6/2012 | Kim et al. |
| 2016/0021516 A1* | 1/2016 | Han ........................ H04W 4/06 370/312 |

(Continued)

FOREIGN PATENT DOCUMENTS

| CN | 1720678 A | 1/2006 |
| CN | 102448018 A | 5/2012 |

(Continued)

OTHER PUBLICATIONS

3GPP TS 23.246 V16.1.0, 3rd Generation Partnership Project; Technical Specification Group Services and System Aspects; Multimedia Broadcast/Multicast Service (MBMS); Architecture and functional description (Release 16), total 77 pages, Sep. 2019.

(Continued)

*Primary Examiner* — Peter Chen
(74) *Attorney, Agent, or Firm* — Kilpatrick Townsend & Stockton LLP (57) ABSTRACT

A multimedia broadcast multicast service (MBMS) receiving method and apparatus are provided. The method includes: determining a first MBMS to be initiated; determining, according to a mapping relationship, a state instruction corresponding to the first MBMS, and the state instruction is used for instructing a terminal to receive the first MBMS in an RRC connected state or a non-RRC connected state; if the state instruction is used for instructing the terminal to receive the first MBMS in the RRC connected state, the terminal determining whether the terminal is currently in the non-RRC connected state; and if the termi- (Continued)

nal is currently in the non-RRC connected state, sending an RRC connection establishment request to a network device, and the RRC connection establishment request includes first instruction information, and the first instruction information is used for indicating that the reason for establishing the present connection is to receive an MBMS.

20 Claims, 3 Drawing Sheets

(58) Field of Classification Search
CPC ..... H04W 76/20; H04W 76/27; H04W 76/40; H04W 72/30; H04W 36/0007; H04W 24/10; H04W 88/02; H04L 12/18; H04L 12/185; H04L 12/189; H04L 65/611
See application file for complete search history.

(56) References Cited

U.S. PATENT DOCUMENTS

| | | |
|---|---|---|
| 2018/0115430 A1 | 4/2018 | Seo |
| 2019/0230564 A1 | 7/2019 | Kim et al. |
| 2020/0204329 A1* | 6/2020 | Fujishiro ............... H04L 1/1861 |

FOREIGN PATENT DOCUMENTS

| | | |
|---|---|---|
| CN | 104579602 A | 4/2015 |
| EP | 2978245 A1 | 1/2016 |
| WO | 2014166071 A1 | 4/2013 |

OTHER PUBLICATIONS

Google, "Correction on cell (re)selection in RRC_Inactive", 3GPP TSG-RAN WG2 Meeting #103, Gothenburg, Sweden, Aug. 20-24, 2018, total 4 pages, R2-1811863.

Nokia Siemens Networks et al., "MBMS feedback configuration", 3GPP TSG-RAN WG2 Meeting #61,Sorrento, Italy Feb. 11-15, 2008, total 4 pages, R2-080953(R2-080209).

* cited by examiner

MULTIMEDIA BROADCAST MULTICAST SERVICE (MBMS) RECEIVING METHOD AND APPARATUS

CROSS REFERENCE TO RELATED APPLICATIONS

This application is a National Stage of International Application PCT/CN2020/135052, filed Dec. 9, 2020, which claims priority to Chinese Patent Application No. 202010079057.0, entitled "MULTIMEDIA BROADCAST MULTICAST SERVICE (MBMS) RECEIVING METHOD AND APPARATUS", and filed to the China National Intellectual Property Administration on Feb. 3, 2020, the entire contents of which are incorporated herein by reference.

FIELD

The present application relates to the field of mobile communication, in particular to a multimedia broadcast multicast service (MBMS) receiving method and apparatus.

BACKGROUND

With the development of a communication technology and the enrichment of demands, and with increasing improvements to standard formulation of a fifth generation communication technology, a multimedia broadcast multicast service (MBMS) technology, as a means of efficiently utilizing physical resources, will be applied to the Internet of Vehicles, public safety and other fields in a 5G R17 version.

At present, for an application scenario of an MBMS service, transmission of MBMS data adopts a scheme of single transmission by a network and passive reception by a terminal. That is, whether the terminal is in a radio resource control (RRC) connected state or a non-RRC connected state, it may passively receive the MBMS data. However, when the data is received in the RRC connected state, a success rate of data reception may be reduced. Especially for the MBMS with high reliability requirements, if the terminal cannot receive the MBMS successfully, normal operation of a terminal service will be affected.

SUMMARY

Embodiments of the present application provide a multimedia broadcast multicast service (MBMS) receiving method and apparatus. The method and apparatus are used for improving the reliability of MBMS data transmission.

In one embodiment, a method for receiving a multimedia broadcast multicast service (MBMS) is provided, and includes:
determining a first MBMS to be initiated;
determining a state instruction corresponding to the first MBMS according to a mapping relationship, the state instruction is configured for instructing the terminal to receive the first MBMS in an RRC connected state or a non-RRC connected state;
determining, by the terminal, whether the terminal is currently in the non-RRC connected state in a case that the state instruction is used for instructing the terminal to receive the first MBMS in the RRC connected state; and
sending an RRC connection establishment request to a network device in a case that the terminal is currently in the non-RRC connected state. The RRC connection establishment request includes first instruction information, and the first instruction information is configured for instructing that a cause for establishing a present connection is to receive an MBMS.

In one embodiment, the mapping relationship is carried in an MBMS control message received by the terminal; or the mapping relationship is pre-configured.

In one embodiment, the mapping relationship includes: a mapping relationship among attribute information, the state instruction and a feedback instruction corresponding to the MBMS.

In one embodiment, the method further includes:
receiving a configuration message sent by the network device and used for instructing the terminal to connect to the network device;
connecting to the network device and entering the RRC connected state based on the configuration message; and receiving the first MBMS sent by the network device.

In one embodiment, after receiving the first MBMS, the method further includes: sending feedback information for instructing whether the terminal successfully receives the first MBMS.

In one embodiment, the method further includes:
receiving a retransmitted MBMS from the network device in response to a failure of reception of the first MBMS. The retransmitted MBMS includes an MBMS adjusted by the network device based on related information of the first MBMS.

In one embodiment, the method further includes:
determining whether the terminal needs to feed back a receiving situation of the first MBMS according to the mapping relationship; and
after receiving the first MBMS, the method further includes:
feeding back the receiving situation of the first MBMS to the network device in response to determining that the terminal needs to feed back the receiving situation of the first MBMS.

In one embodiment, the non-RRC connected state includes: an RRC idle state and/or an RRC inactive state.

In one embodiment, a method for sending a multimedia broadcast multicast service (MBMS) is provided, and includes:
sending a mapping relationship to a terminal, where the mapping relationship includes a state instruction corresponding to a first MBMS, and the state instruction is configured for instructing the terminal to receive the first MBMS in an RRC connected state or a non-RRC connected state; and
receiving an RRC connection establishment request sent by the terminal, where the RRC connection establishment request includes first instruction information, and the first instruction information is configured for instructing that a cause for the terminal to establish a present connection is to receive an MBMS.

In one embodiment, the mapping relationship is carried in an MBMS control message sent by a network device.

In one embodiment, the mapping relationship includes: a mapping relationship among attribute information, the state instruction and a feedback instruction corresponding to the MBMS.

In one embodiment, the method further includes:
sending a configuration message, used for instructing the terminal to connect to the network device, to the terminal, for enabling the terminal to connect to the network device and enter the RRC connected state based on the configuration message; and sending the first MBMS to the terminal.

In one embodiment, after sending the first MBMS to the terminal, the method further includes:

receiving feedback information sent by the terminal and used for instructing whether the terminal successfully receives the first MBMS.

In one embodiment, the method further includes:

retransmitting an MBMS to the terminal in response to a failure of reception of the first MBMS. The retransmitted MBMS includes an MBMS adjusted by the network device based on related information of the MBMS.

In one embodiment, the mapping relationship further includes a feedback instruction, and the feedback instruction is configured for instructing whether the terminal needs to feed back a receiving situation of the first MBMS.

In one embodiment, the non-RRC connected state includes: an RRC idle state and/or an RRC inactive state.

In one embodiment, an apparatus for receiving a multimedia broadcast multicast service (MBMS) is provided, and includes:

a processing module, configured to determine a first MBMS to be initiated, the processing module is further configured to determine a state instruction corresponding to the first MBMS according to a mapping relationship, and the state instruction is configured for instructing a terminal to receive the first MBMS in an RRC connected state or a non-RRC connected state, and the processing module is further configured to determine whether the terminal is currently in the non-RRC connected state when the state instruction is configured for instructing the terminal to receive the first MBMS in the RRC connected state; and a communication module configured to send an RRC connection establishment request to a network device when the terminal is currently in the non-RRC connected state, the RRC connection establishment request includes first instruction information, and the first instruction information is configured for instructing that a cause for establishing a present connection is to receive an MBMS.

In one embodiment, the mapping relationship is carried in an MBMS control message received by the terminal; or the mapping relationship is pre-configured.

In one embodiment, the mapping relationship includes: a mapping relationship among attribute information, the state instruction and a feedback instruction corresponding to the MBMS.

In one embodiment, the communication module is further configured to: receive a configuration message sent by the network device and used for instructing the terminal to connect to the network device;

the processing module is further configured to: connect to the network device and enter the RRC connected state based on the configuration message; and the communication module is further configured to: receive the first MBMS sent by the network device.

In one embodiment, after the communication module receives the first MBMS, the communication module is further configured to: send feedback information used for instructing whether the terminal successfully receives the first MBMS.

In one embodiment, the communication module is further configured to:

receive retransmitted an MBMS from the network device in response to a failure of reception of the first MBMS; and the retransmitted MBMS includes an MBMS adjusted by the network device based on related information of the MBMS.

In one embodiment, the processing module is further configured to:

determine whether the terminal needs to feed back a receiving situation of the first MBMS according to the mapping relationship; and after the communication module receives the first MBMS, the communication module is further configured to:

feedback the receiving situation of the first MBMS to the network device when the processing module determines that the terminal needs to feed back the receiving situation of the first MBMS.

In one embodiment, the non-RRC connected state includes: an RRC idle state and/or an RRC inactive state.

In one embodiment, an apparatus for sending a multimedia broadcast multicast service (MBMS) is provided, and includes:

a communication module, configured to send a mapping relationship to a terminal, where the mapping relationship includes a state instruction corresponding to a first MBMS, and the state instruction is configured for instructing the terminal to receive the first MBMS in an RRC connected state or a non-RRC connected state;

the communication module is further configured to receive an RRC connection establishment request sent by the terminal. The RRC connection establishment request includes first instruction information, and the first instruction information is configured for instructing that a cause for the terminal to establish a present connection is to receive an MBMS.

In one embodiment, the mapping relationship is carried in an MBMS control message sent by a network device.

In one embodiment, the mapping relationship includes: a mapping relationship among attribute information, the state instruction and a feedback instruction corresponding to the MBMS.

In one embodiment, the communication module is further configured to:

send a configuration message, used for instructing the terminal to connect to the network device, to the terminal, for enabling the terminal to connect to the network device and enter the RRC connected state based on the configuration message; and send the first MBMS to the terminal.

In one embodiment, after the communication module sends the first MBMS to the terminal, the communication module is further configured to:

receive feedback information sent by the terminal and used for instructing whether the terminal successfully receives the first MBMS.

In one embodiment, the apparatus further includes:

a processing module, configured to control the communication module to retransmit an MBMS to the terminal in response to a failure of reception of the first MBMS. The retransmitted MBMS includes an MBMS adjusted by the processing module based on related information of the MBMS.

In one embodiment, the mapping relationship further includes a feedback instruction, and the feedback instruction is used for instructing whether the terminal needs to feed back a receiving situation of the first MBMS.

In one embodiment, the non-RRC connected state includes: an RRC idle state and/or an RRC inactive state.

In one embodiment, an electronic device is provided, and includes:

a memory, configured to store program instructions; and a processor, configured to call the program instructions stored in the memory and execute, according to the obtained programs, the steps included by the method according to any one of the other embodiments.

In one embodiment, a computer readable storage medium is provided, the computer readable storage medium stores computer executable instructions which are used for enabling a computer to execute the steps included by the method according to any one of the other embodiments.

In one embodiment, a computer program product containing instructions is provided. when the computer program product runs on a computer, the computer is enabled to execute the multimedia broadcast multicast service (MBMS) receiving method described in various possible implementations above.

In the embodiments of the present application, the terminal first determines the first MBMS to be initiated, and then determines whether the terminal needs to receive the first MBMS in the RRC connected state or the non-RRC connected state according to the mapping relationship between the first MBMS and the corresponding state instruction. In response to determining that the terminal needs to receive in the RRC connected state, the terminal determines whether its current state is the RRC connected state or the non-RRC connected state. When the current state of the terminal is the non-RRC connected state, the terminal sends the RRC connection establishment request to the network device, and instructs in the request that the cause for establishing the present connection is to receive the MBMS.

That is, when the terminal determines that the first MBMS needs to be received in the RRC connected state, the RRC connection establishment request is sent to the network device, and it is indicated in the connection establishment request that the cause for establishing the connection is to receive the MBMS, and the terminal may receive the first MBMS in the RRC connected state. In this way, when the terminal is in the non-RRC connected state and needs to receive an MBMS with a high reliability requirement, it may send the connection establishment request to the network device, and enter the RRC connected state to receive the MBMS with the high reliability requirement, and the reliability of MBMS data transmission is improved.

BRIEF DESCRIPTION OF THE DRAWINGS

In order to more clearly illustrate the embodiments, the accompanying drawings needed in the description of the embodiments will be briefly introduced. The accompanying drawings in the following description are only some embodiments of the present application.

DETAILED DESCRIPTION OF THE EMBODIMENTS

In order to make the embodiments of the present application clearer, the embodiments of the present application will be clearly and completely described below in conjunction with the accompanying drawings in the embodiments of the present application. The described embodiments are only a part of the embodiments of the present application, not all of the embodiments. Under a condition of no conflict, the embodiments in the present application and the features in the embodiments can be combined arbitrarily with each other. In one embodiment, although a logical order is shown in the flow chart, in some cases, the steps shown or described may be executed in a different order than here.

The terms "first" and "second" in the description and claims of the present application and the above accompanying drawings are used to distinguish different objects, not to describe a specific order. In addition, the term "include" and any variations thereof are intended to cover non-exclusive protection. For example, a process, method, system, product or device containing a series of steps or units is not limited to the listed steps or units, but may also include the steps or units not listed, or may also include other steps or units fixed to these processes, methods, products or devices. "A plurality of" in the present application may mean at least two, such as two, three or more, which is not limited in the embodiments of the present application.

In addition, the term "and/or" herein is only an association relationship describing associated objects, indicating that there may be three kinds of relationships, for example, A and/or B may mean that there are three cases of A alone, A and B at the same time, and B alone. In addition, the character "/" herein, without special description, generally indicates that the front and rear associated objects are in an "or" relationship.

For ease of understanding, the background of the embodiments of the present application is introduced below.

As mentioned earlier, how to improve the reliability of MBMS data transmission is an urgent problem to be solved at present. At present, when a terminal receives MBMS data sent by a network device, the terminal does not consider its own state, and whether the terminal is in an RRC connected state or a non-RRC connected state, it always passively receives. Therefore, when the terminal receives MBMS data with high reliability requirements, it may fail to receive, which affects the normal operation of a terminal service, and consequently, it cannot meet the conditions with high reliability requirements during MBMS data transmission.

In order to improve the reliability of MBMS data transmission, the present application provides a scheme of a method for receiving a multimedia broadcast multicast service (MBMS). In the scheme, when the terminal determines that a first MBMS to be received needs to be received in the RRC connected state according to a mapping relationship, it sends a connection establishment request to the network device, and indicates in the request that a cause for establishing a connection is to receive an MBMS, and the terminal can keep receiving the first MBMS in the RRC connected state, and the reliability of MBMS data transmission is improved.

After introducing the design idea of the embodiments of the present application, application scenarios applicable to the embodiments of the present application are briefly introduced below. It should be noted that the application scenarios introduced below are only used to illustrate the embodiments of the present application, rather than to limit. During specific implementation, the embodiments of the present application may be flexibly applied according to actual needs.

Figure 1:
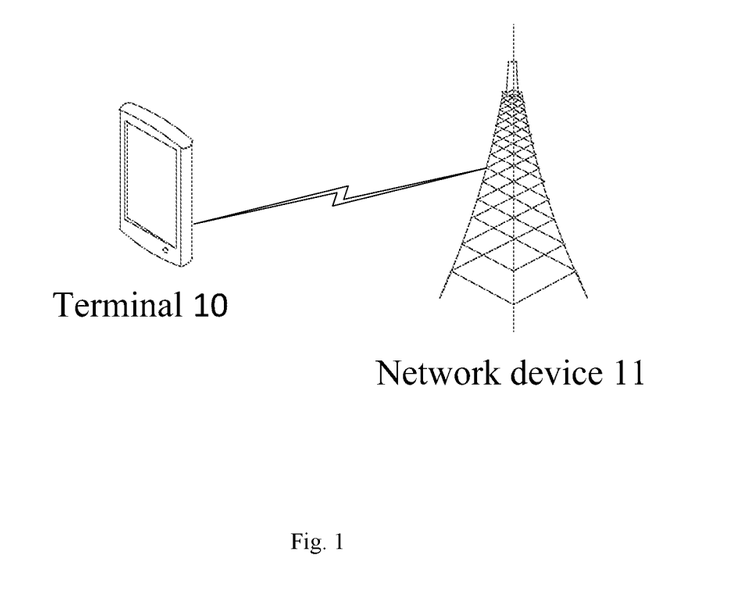
FIG. 1 is a schematic diagram of an application scenario provided by an embodiment of the present application.

Please refer to FIG. 1, FIG. 1 shows an application scenario that can be used by the embodiments of the present application. In this application scenario, a terminal 10 and a network device 11 are included. The terminal 10 may be a mobile phone, a tablet computer, a notebook computer, an ultra-mobile personal computer (UMPC), a netbook, a personal digital assistant (PDA), etc. The network device 11 may be a base station, and the base station may be a commonly used base station, an evolved node base station (eNB), a network side device (such as, a next generation node base station (gNB), or a transmission and reception point) in a 5G system, or a cell.

In the embodiments of the present application, the terminal 10 determines a first MBMS to be initiated, and it is determined whether the terminal 10 receives the first MBMS in an RRC connected state or a non-RRC connected state according to a state instruction in a mapping relationship. If it is determined according to the state instruction that the terminal 10 receives the first MBMS in the RRC connected state, the terminal 10 determines whether it is currently in the non-RRC connected state. When the terminal 10 determines that it is currently in the non-RRC connected state, the terminal 10 sends an RRC connection establishment request to the network device 11. The connection establishment request includes first instruction information, which is used for instructing that a cause for establishing a present connection is to receive an MBMS. Therefore, when receiving an MBMS with a high reliability requirement, the terminal 10 may enter the RRC connected state to receive, and the reliability of data transmission is enhanced.

The embodiments of the present application are introduced below in combination with the accompanying drawings of the description.

Figure 2:
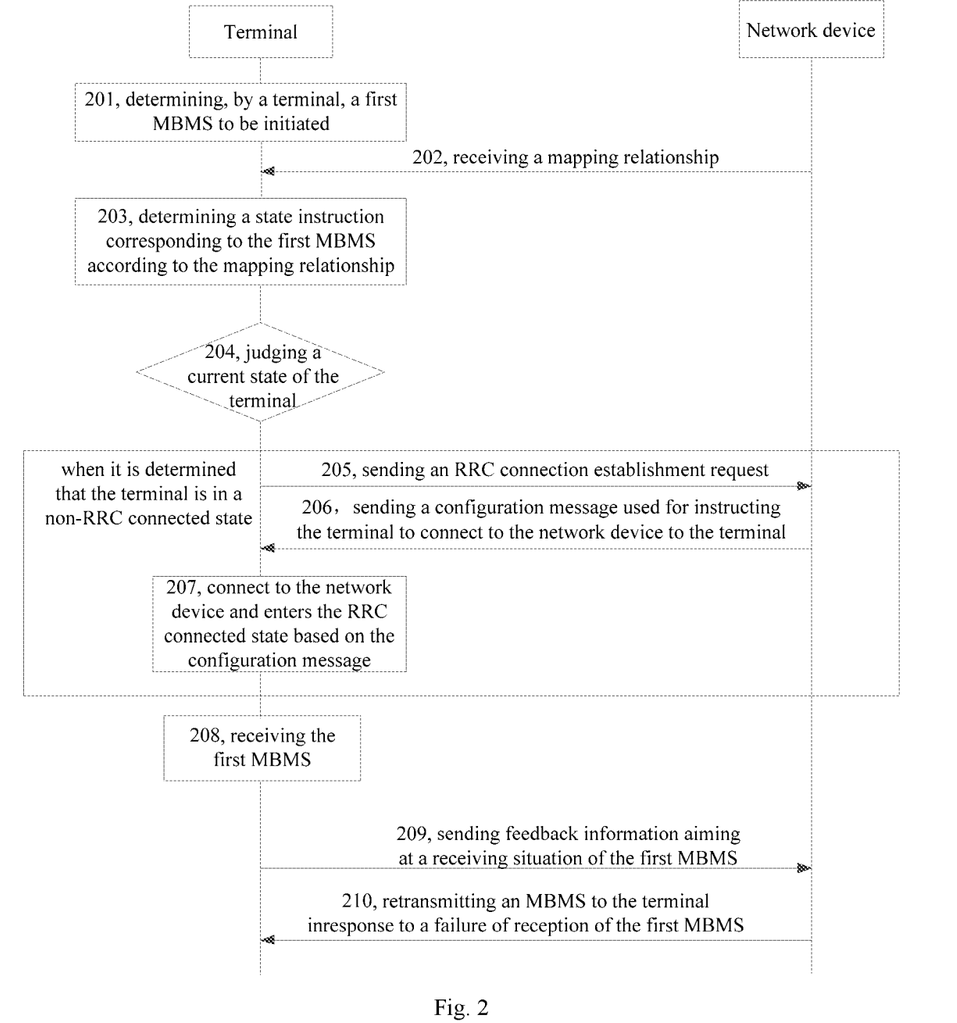
FIG. 2 is an interactive flow of a method for receiving and sending a multimedia broadcast multicast service (MBMS) provided by an embodiment of the present application.

Referring to FIG. 2, FIG. 2 is an interactive flow of a method for receiving and sending a multimedia broadcast multicast service (MBMS) provided by the embodiments of the present application. The method flow described in FIG. 2 is as follows:

Step 201: determining, by a terminal, a first MBMS to be initiated.

Step 202: receiving, by the terminal, a mapping relationship.

In the embodiments of the present application, the mapping relationship may have a variety of situations, including but not limited to the following two mapping relationships.

First, the mapping relationship includes a mapping relationship between attribute information corresponding to an MBMS and an RRC state instruction corresponding to an MBMS. In this mapping relationship, the state instruction corresponding to RRC, for example, may be specifically set as "RrcStateInd". Exemplarily, the mapping relationship may be Table 1 below. It should be understood that Table 1 is only an example of the mapping relationship, not a limitation, and other forms of the mapping relationship are also feasible.

TABLE 1

| Attribute information corresponding to an MBMS | RRC state instruction (RrcStateInd) |
|---|---|
| First MBMS (high reliability) | TRUE (correct) |
| Second MBMS (low reliability) | FALSE (error) |

The attribute information corresponding to the MBMS may include a name of the MBMS and corresponding reliability requirements. For example, the name of the MBMS is first MBMS, it can be seen from Table 1 above that the RRC state instruction corresponding to the first MBMS is TRUE (correct), that is, the terminal needs to receive the first MBMS in an RRC connected state. For another example, the name of the MBMS is second MBMS, it can be seen from Table 1 above that the RRC state instruction corresponding to the second MBMS is FALSE (error), that is, the terminal does not need to receive the second MBMS in the RRC connected state.

Second, the mapping relationship refers to a mapping relationship among the attribute information, the RRC state instruction, and a feedback instruction corresponding to the MBMS.

In this mapping relationship, the feedback instruction, for example, may be set as "HARQFeedbackInd". Accordingly, the mapping relationship may be Table 2 below, which is the same as the above Table 1. It should be understood that Table 2 is only an example of the mapping relationship, not a limitation, and other forms of the mapping relationship are also feasible.

TABLE 2

| Attribute information corresponding to an MBMS | RRC state instruction (RrcStateInd) | Feedback instruction (HARQFeedbackInd) |
|---|---|---|
| First MBMS (high reliability) | TRUE | Yes/No |
| Second MBMS (low reliability) | FALSE | No |

For example, the name of the MBMS is first MBMS, it can be seen from Table 2 above that the RRC state instruction corresponding to the first MBMS is TRUE, at this time, the corresponding feedback instruction is "yes or no", and when the corresponding feedback instruction is "yes", it indicates that the terminal needs to send a feedback message to the network device. When the corresponding feedback instruction is "no", it indicates that the terminal does not need to send the feedback message to the network device.

For another example, the name of the MBMS is second MBMS. It can be seen from Table 2 above that the RRC state instruction corresponding to the second MBMS is FALSE, and that the corresponding feedback instruction is "no", which indicates that the terminal does not need to send the feedback message to the network device. In other words, for an MBMS with a low reliability requirement, the terminal does not need to send the feedback message to the network device.

In a possible implementation, the mapping relationship is carried in an MBMS control message received by the terminal. The control message, for example, may be a system message or other MBMS relevant control messages. In another possible implementation, the mapping relationship is pre-configured in each MBMS service.

In the condition that the mapping relationship is carried in the MBMS control message received by the terminal, the terminal needs to receive the mapping relationship from the network device, and the network device can send the mapping relationship in an air interface message. Before the network device sends the mapping relationship, for the MBMS with the high reliability requirement, the network device may select terminals for reporting according to a current network resource condition. When network resources are rich, all terminals may be instructed to send feedback messages to the network device. When the network resources are scarce, the network device may select some terminals to send the feedback messages to the network device, that is, the rest of the terminals do not need to send the feedback messages to the network device. At this time, the feedback instruction determined by the terminals that do not need to send the feedback messages to the network device according to the mapping relationship is "no", and the feedback instruction determined by the terminals that need to send the feedback messages to the network device according to the mapping relationship is "yes".

In the condition that the mapping relationship is pre-configured in each MBMS service, the terminal does not need to receive the mapping relationship from the network device. The feedback instruction in the mapping relationship is also pre-configured, and for the MBMS with the high reliability requirement, all terminals need to send the feedback messages to the network device. It should be noted that since the mapping relationship is not necessarily sent by the network device, the receiving mapping relationship is represented in the form of a dotted line in FIG. 2.

Step 203, determining, by the terminal, a state instruction corresponding to the first MBMS according to the mapping relationship.

In the embodiments of the present application, in the condition that the mapping relationship is Table 1 above, the terminal determines according to Table 1 that the state instruction corresponding to the first MBMS is that it needs to be received in the RRC connected state and the second MBMS does not need to be received in the RRC connected state. In the condition that the mapping relationship is Table 2 above, the terminal determines according to Table 2 that the state instruction corresponding to the first MBMS is that it needs to be received in the RRC connected state, the corresponding feedback instruction is that the terminal needs to send a feedback message of a receiving situation of the first MBMS to the network device, the second MBMS does not need to be received in the RRC connected state, and the corresponding feedback instruction is that the terminal does not need to send a feedback message of a receiving situation of the second MBMS to the network device.

In a specific implementation process, when the terminal determines the first MBMS to be initiated, the corresponding RRC state instruction may be determined through the mapping relationship corresponding to the first MBMS, and it is determined that the first MBMS should be received in the RRC connected state or the non-RRC connected state.

Step 204: determining, by the terminal, a current state of the terminal.

In the embodiments of the present application, if the terminal determines that the first MBMS needs to be received in the RRC connected state, the terminal needs to determine its current state. The current state of the terminal may be the RRC connected state or the non-RRC connected state. The non-RRC connected state includes an RRC idle state and/or an RRC inactive state. The RRC inactive state is an RRC state other than the RRC connected state and the RRC idle state. In principle, the RRC inactive state only acts on an access layer between a wireless access network node and a mobile terminal, and does not involve a non-access layer between the network device and a core network.

Step 205: sending, by the terminal, an RRC connection establishment request.

In the embodiments of the present application, if the terminal determines according to the mapping relationship that the first MBMS to be initiated needs to be received in the RRC connected state, and the current state of the terminal is the non-RRC connected state, the terminal needs to send the connection establishment request to the network device, and indicates in the connection establishment request that a cause for establishing a present connection is to receive an MBMS.

In a possible implementation, the RRC state instruction of the terminal in the mapping relationship of the first MBMS to be initiated is that it needs to be received in the RRC connected state (that is, RrcStateInd corresponding to the first MBMS is TRUE), and the current state of the terminal is the RRC idle state. At this time, the terminal sends the connection establishment request to the network device, and adds to the RRC connection establishment request RRCConnectionRequest that the cause for establishing the present connection is to receive the MBMS (for example, a specific setting is RRCConnectionRequest (EstablishmentCause=MbmsServiceReceiving)).

For example, a specific setting mode is as follows:

EstablishmentCause::=ENUMERATED {
emergency, highPriorityAccess, mt-Access, mo-Signalling,
mo-Data,mo-VoiceCall,mo-VideoCall,mo-SMS,mps-PriorityAccess,
mcs-PriorityAccess,
MbmsServiceReceiving,
spare5, spare4, spare3, spare2, spare1}.

In another possible implementation, the RRC state instruction of the terminal in the mapping relationship of the first MBMS to be initiated is that it needs to be received in the RRC connected state (that is, RecStateInd corresponding to the first MBMS is TRUE), and the current state of the terminal is the RRC inactive state. At this time, the terminal sends a connection resume request (for example, it may also be called a reconnection establishment request) to the network device, and sets a cell "resumeCause" as a new cause for receiving the MBMS in the reconnection establishment request RRCResumeRequest or RRCResumeRequest1 (for example, it may be specifically set as RRCResumeRequest/RRCResumeRequest1 (resumeCause=MbmsServiceReceiving)).

For example, the specific setting mode is as follows:

ResumeCause::=ENUMERATED {
emergency, highPriorityAccess, mt-Access, mo-Signalling,
mo-Data,mo-VoiceCall,mo-VideoCall,mo-SMS,rna-Update,mps-PriorityAccess,
mcs-PriorityAccess,
MbmsServiceReceiving,
spare1, spare2, spare3, spare4, spare5}.

In some embodiments, the RRC state instruction of the terminal in the mapping relationship of the first MBMS to be initiated is that it needs to be received in the RRC connected state (that is, RrcStateInd corresponding to the first MBMS is True), and the current state of the terminal is the RRC connected state, and the terminal does not need to send the connection establishment request to the network device, and may directly receive the first MBMS in the current state.

In a specific implementation process, when the terminal is in different states, the connection establishment requests sent to the network device are different, that is, cells in the connection establishment causes are different. In this way, the terminal may inform the network device of its own state through the cause for establishing the present connection, and the network device is aware of the state of the terminal, and configures resources for the terminal according to the state of the terminal.

Step 206, sending, by the network device, a configuration message used for instructing the terminal to connect to the network device to the terminal.

In the embodiments of the present application, after the network device receives the connection establishment request sent by the terminal, the state of the terminal may be determined from the connection establishment cause, then an accessible channel and other information is allocated for the terminal, and a configuration message of an accessed channel and other information is sent to the terminal.

In a specific implementation process, the terminal sends different connection establishment requests to the network device according to different states, and the network device may be aware of the current state of the terminal, and reasonably allocates the resources.

Step 207, the terminal connects to the network device and enters the RRC connected state based on the configuration message.

In the embodiments of the present application, the terminal connects to the network device and enters the RRC connected state according to the configuration message sent by the network device.

Step 208: receiving, by the terminal, the first MBMS.

Step 209: sending, by the terminal, feedback information aiming at a receiving situation of the first MBMS.

In the embodiments of the present application, after receiving the first MBMS sent by the network device, the terminal sends the feedback information of the receiving situation of the first MBMS to the network device, and the network device may determine whether the terminal successfully receives the first MBMS according to the feedback information. Specifically, a process for the terminal to feed back the receiving situation of the first MBMS to the network device is that an RRC layer of the terminal instructs a physical layer to start hybrid automatic repeat request (HARQ) feedback for MBMS service data scheduled by corresponding G-RNTI mapped to the first MBMS, and when the physical layer receives MBMS user data scheduled by the G-RNTI, HARQ feedback is performed.

In a specific implementation process, the terminal feeds back a receiving situation of an MBMS to be received to the network device, and the network device may accordingly adjust a transmission scheme according to the feedback information.

In a possible implementation, before sending the feedback information of the receiving situation of the first MBMS to the network device, the terminal may further determine that whether the terminal needs to send the feedback message to the network device according to the mapping relationship corresponding to the first MBMS (for example, when the mapping relationship is Table 2 above, whether the terminal needs to send the feedback message to the network device may be determined according to the mapping relationship of Table 2). The receiving situation of the first MBMS is fed back to the network device when it is determined that the terminal needs to feed back the receiving situation of the first MBMS. For example, when the terminal receives the second MBMS sent by the network device in the RRC connected state, it can be seen from Table 2 above that the mapping relationship corresponding to the second MBMS is that the reliability requirement of the second MBMS is low, it does not need to be received in the RRC connected state, and the terminal does not need to send feedback information of a receiving situation of the second MBMS of the terminal to the network device. At this time, although the second MBMS is received in the RRC connected state, the terminal does not need to feed back the receiving situation of the second MBMS to the network device.

In a specific implementation process, the terminal selectively enters the RRC_CONNECTED state according to different reliability requirements of different MBMSs, and performs HARQ feedback, which meets different reliability requirements of the different MBMSs.

Step 210: retransmitting, by the network device, an MBMS to the terminal in response to a failure of reception of the first MBMS.

In the embodiments of the present application, the terminal feeds back the receiving situation of the first MBMS to the network device. When the network device determines that the terminal fails to receive the first MBMS according to the feedback information sent by the terminal, the network device adjusts a transmission scheme of the first MBMS according to the feedback from the terminal. In a possible implementation, the network device retransmits old data (that is, retransmits the data that the terminal fails to receive) for data of the first MBMS on which the terminal feeds back failure of reception. In another possible implementation, the network device adjusts the transmission scheme of the first MBMS, for example, adjusts a transmit power, or adjusts a modulation and coding scheme (MCS), and then transmits the data through a new transmission scheme.

In a specific implementation process, the network device retransmits according to the feedback of the terminal on the receiving situation of the first MBMS data, or adjusts the transmission scheme according to the feedback of the terminal on the receiving situation of the first MBMS data, which can effectively improve the reliability of data transmission.

In some embodiments, the terminal determines according to the mapping relationship that the state instruction corresponding to the first MBMS further includes various cases. For ease of understanding, the following examples are used for description.

Case 1.

In step 203 in the above embodiments, when the terminal determines that the state instruction corresponding to the first MBMS is the non-RRC connected state, and current state of the terminal is the non-RRC connected state, the terminal does not need to switch the current state. At this time, the terminal does not need to send request information for switching the current state to the network device, and instead, directly receives the first MBMS in the current state.

Case 2.

In step 203 in the above embodiments, when the terminal determines that the state instruction corresponding to the first MBMS is the non-RRC connected state, and its current state is the RRC connected state, the terminal may choose to receive the first MBMS in the RRC connected state, and may also choose to receive by switching the current state to the non-RRC connected state. If the terminal chooses to receive the first MBMS in the current state (namely the RRC connected state), after receiving is completed, the terminal does not need to send the feedback message of the receiving situation of the first MBMS to the network device (it may be determined according to the mapping relationship that for the MBMS service received in the non-RRC connected state, the feedback message does not need to be sent to the network device). If the terminal chooses to switch the current state to the non-RRC connected state, the terminal sends a connection release request to the network device, and indicates in the request whether the current state needs to be switched to the RRC idle state or the RRC inactive state. After the terminal state is successfully switched, the first MBMS is received in the state after switching (the RRC idle state or the RRC inactive state).

Case 3.

In step 203 in the above embodiments, when the terminal determines that the state instruction corresponding to the first MBMS is the RRC connected state, and its current state is the RRC connected state, the terminal may directly receive the first MBMS, and does not need to send the connection establishment request to the network device.

Case 4.

In step 203 in the above embodiments, when the terminal determines that the state instruction corresponding to the first MBMS is the RRC connected state, and its current state is the non-RRC connected state, the terminal may execute step 205 to step 210.

In a specific implementation process, when the terminal receives the MBMS service with the high reliability requirement, it may enter the RRC connected state to receive, and send the feedback message of the receiving situation of the MBMS to the network device, and the network device may adjust the transmission scheme timely when the terminal fails to receive, and the reliability of data transmission is improved.

The embodiments of the present application provide an apparatus for receiving a multimedia broadcast multicast service (MBMS). The apparatus receiving a multimedia broadcast multicast service (MBMS) can realize functions corresponding to the above-mentioned the method for receiving a multimedia broadcast multicast service (MBMS). The apparatus for receiving the multimedia broadcast multicast service (MBMS) may be a hardware structure, a software module, or a combination of the hardware structure and the software module. The apparatus may be realized by a chip system, and the chip system may be composed of chips, or may contain a chip and other discrete devices. Please refer to FIG. 3, the multimedia broadcast multicast service (MBMS) receiving apparatus includes a processing device 301 and a communication device 302.

Figure 3:
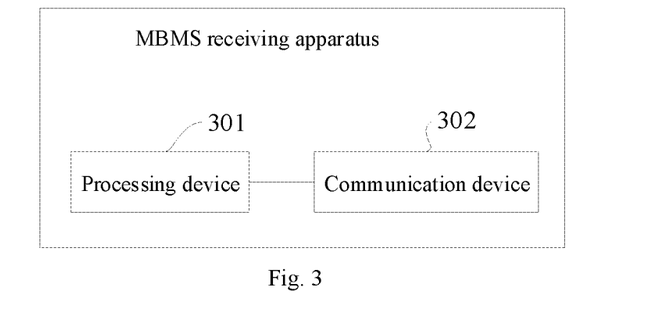
FIG. 3 is a structural block diagram of an apparatus for receiving a multimedia broadcast multicast service (MBMS) provided by an embodiment of the present application.

The processing device 301 is configured to determine a first MBMS to be initiated;

the processing device 301 is further configured to determine a state instruction corresponding to the first MBMS according to a mapping relationship, and the state instruction is configured for instructing a terminal to receive the first MBMS in an RRC connected state or a non-RRC connected state;

the processing device 301 is further configured to determine whether the terminal is currently in the non-RRC connected state when the state instruction is configured for instructing the terminal to receive the first MBMS in the RRC connected state.

the communication device 302 is configured to send, when the terminal is currently in the non-RRC connected state, an RRC connection establishment request to a network device. The RRC connection establishment request includes first instruction information, and the first instruction information is configured for instructing that a cause for establishing a present connection is to receive an MBMS.

In a possible implementation, the mapping relationship is carried in an MBMS control message received by the terminal; or the mapping relationship is pre-configured.

In a possible implementation, the mapping relationship includes: a mapping relationship among attribute information, the state instruction and a feedback instruction corresponding to the MBMS.

In a possible implementation, the communication device 302 is further configured to: receive a configuration message sent by the network device and used for instructing the terminal to connect to the network device;

the processing device 301 is further configured to: connect to the network device and enter the RRC connected state based on the configuration message;

the communication device 302 is further configured to: receive the first MBMS sent by the network device.

In a possible implementation, after the communication device 302 receives the first MBMS, the communication device 302 is further configured to:

send feedback information used for instructing whether the terminal successfully receives the first MBMS.

In a possible implementation, the communication device 302 is further configured to:

receive an MBMS retransmitted from the network device in response to a failure of reception of the first MBMS. The retransmitted MBMS includes an MBMS adjusted by the network device based on related information of the first MBMS.

In a possible implementation, the processing device 301 is further configured to:

determine whether the terminal needs to feed back a receiving situation of the first MBMS according to the mapping relationship, after the communication device 302 receives the first MBMS, the communication device 302 is further configured to:

feedback the receiving situation of the first MBMS to the network device when the processing device 301 determines that the terminal needs to feed back the receiving situation of the first MBMS.

In a possible implementation, the non-RRC connected state includes: an RRC idle state and/or an RRC inactive state.

All relevant contents of the steps involved in the embodiments of the above-mentioned method for receiving the multimedia broadcast multicast service (MBMS) may be cited in the functional descriptions of functional modules corresponding to the multimedia broadcast multicast service (MBMS) receiving apparatus in the embodiment of the present application, which will not be repeated here.

The embodiments of the present application provide an apparatus for sending a multimedia broadcast multicast service (MBMS). The multimedia broadcast multicast service (MBMS) sending apparatus can realize functions corresponding to the above-mentioned method for sending the multimedia broadcast multicast service (MBMS). The multimedia broadcast multicast service (MBMS) sending apparatus may be a hardware structure, a software module, or a combination of the hardware structure and the software module. The MBMS sending apparatus may be realized by a chip system, and the chip system may be composed of chips, or may contain a chip and other discrete devices. Please refer to FIG. 4, the multimedia broadcast multicast service (MBMS) sending apparatus includes a communication device 401 and a processing device 402.

Figure 4:
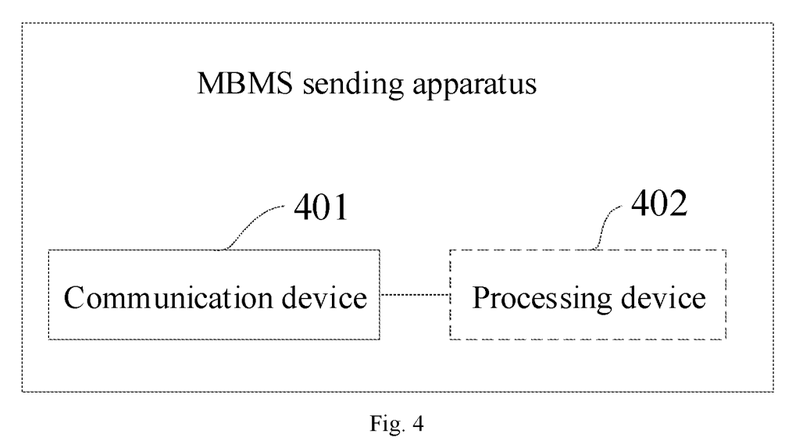
FIG. 4 is a structural block diagram of an apparatus for sending a multimedia broadcast multicast service (MBMS) provided by an embodiment of the present application.

The communication device 401 is configured to send a mapping relationship to a terminal, the mapping relationship includes a state instruction corresponding to a first MBMS, and the state instruction is used for instructing the terminal to receive the first MBMS in an RRC connected state or a non-RRC connected state;

the communication device 401 is further configured to receive an RRC connection establishment request sent by the terminal, the RRC connection establishment request includes first instruction information, and the first instruction information is configured for instructing that a cause for the terminal to establish a present connection is to receive an MBMS.

In a possible implementation, the mapping relationship is carried in an MBMS control message sent by a network device.

In a possible implementation, the mapping relationship includes: a mapping relationship among attribute information, the state instruction and a feedback instruction corresponding to the MBMS.

In a possible implementation, the communication device 401 is further configured to:

send a configuration message, used for instructing the terminal to connect to the network device, to the terminal, for enabling the terminal to connect to the network device and enter the RRC connected state based on the configuration message; and send the first MBMS to the terminal.

In a possible implementation, after the communication device 401 sends the first MBMS to the terminal, the communication device 401 is further configured to:

receive feedback information sent by the terminal and used for instructing whether the terminal successfully receives the first MBMS.

In a possible implementation, the apparatus further includes:

a processing device 402, configured to control the communication device to retransmit an MBMS to the terminal in response to a failure of reception of the first MBMS, and the retransmitted MBMS includes an MBMS adjusted by the processing device based on related information of the first MBMS.

In a possible implementation, the mapping relationship further includes a feedback instruction, and the feedback instruction is used for instructing whether the terminal needs to feed back a receiving situation of the first MBMS.

In a possible implementation, the non-RRC connected state includes: an RRC idle state and/or an RRC inactive state.

All relevant contents of the steps involved in the embodiments of the above-mentioned MBMS sending method may be cited in the functional descriptions of functional modules corresponding to the MBMS sending apparatus in the embodiment of the present application, which will not be repeated here.

The division of modules in the embodiments of the present application is schematic, which is only a logical function division, and there may be other division modes in actual implementation. In addition, the functional modules in each embodiment of the present application may be integrated in one processor, or may exist physically alone; or two or more modules may be integrated in one module. The above integrated modules may be realized in the form of hardware, and may also be realized in the form of software functional modules.

Figure 5:
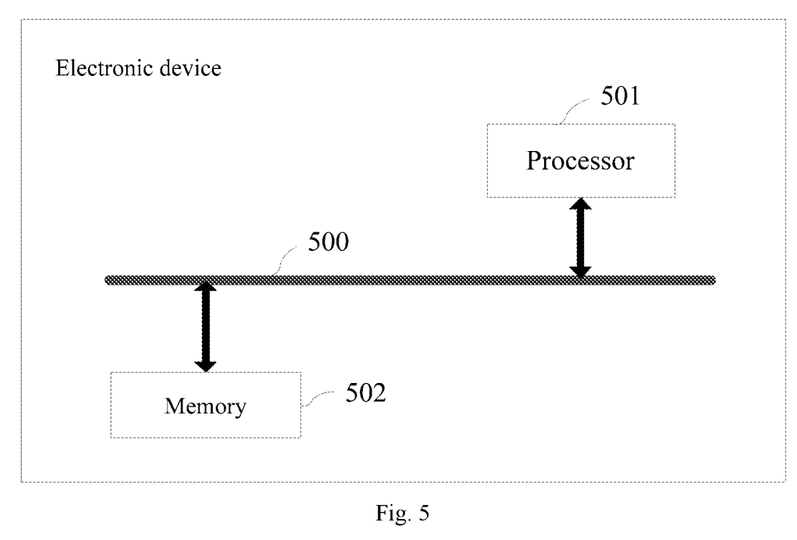
FIG. 5 is a schematic structural diagram of an electronic device provided by an embodiment of the present application.

The embodiments of the present application provide an electronic device. Please refer to FIG. 5, the electronic device includes at least one processor 501 and a memory 502 connected to the at least one processor, and a specific connection medium between the processor 501 and the memory 502 is not limited in the embodiment of the present application. FIG. 5 takes the situation that the processor 501 and the memory 502 are connected through a bus 500 as an example, the bus 500 is represented by a thick line in FIG. 5, and a connection mode between other components is only for schematic illustration, rather than to generate limitation. The bus 500 may be divided into an address but, a data bus, a control bus, etc. For ease of representation, only one thick line is used in FIG. 5 for representation, but it does not mean that there is only one bus or one type of bus.

In the embodiments of the present application, the memory 502 stores instructions that may be executed by the at least one processor 501. By executing the instructions stored in the memory 502, the at least one processor 501 may execute the steps included in the above-mentioned MBMS receiving or sending method.

The processor 501 is a control center of the electronic device, which may use various interfaces and lines to connect various parts of the whole electronic device. The electronic device is monitored as a whole by running or executing the instructions stored in the memory 502 and calling data stored in the memory 502, and various functions and processing data of the electronic device. In one embodiment, the processor 501 may include one or more processing units, the processor 501 may integrate an application processor and a modem processor. The application processor mainly processes an operation system, an application program, etc., and the modem processor mainly processes wireless communication. It can be understood that the above modem processor may also not be integrated into the processor 501. In some embodiments, the processor 501 and the memory 502 may be implemented on the same chip, and in some embodiments, they may be implemented separately on separate chips.

The processor 501 may be a general-purpose processor, such as a central processing unit (CPU), a digital signal processor, an application specific integrated circuit, a field programmable gate array or other programmable logic device, a discrete gate or transistor logic device and a discrete hardware component, which can realize or execute the methods, steps and logic block diagrams disclosed in the embodiments of the present application. The general-purpose processor may be a microprocessor or any conventional processor. The steps of the MBMS receiving or sending method disclosed in combination with the embodiments of the present application may be directly reflected in the execution of the hardware processor, or a combination of hardware and software modules in the processor.

As a non-transitory computer-readable storage medium, the memory 502 may be configured to store a nonvolatile software program, a nonvolatile computer executable program and a module. The memory 502 may include at least one type of storage medium, such as a flash memory, a hard disk, a multimedia card, a card type memory, a random access memory (RAM), a static random access memory (SRAM), a programmable read only memory (PROM), a read only memory (ROM), an electrically erasable programmable read-only memory (EEPROM), a magnetic memory, a magnetic disk, an optical disk, etc. The memory 502 is any other medium that may be configured to carry or store desired program codes in the form of instructions or data structures and may be accessed by a computer, but is not limited thereto. The memory 502 in the embodiments of the present application may further be a circuit or any other apparatus to realize a storage function for storing program instructions and/or data.

By designing and programming the processor 501, the codes corresponding to the MBMS receiving or sending method introduced in the above-mentioned embodiments may be solidified into a chip, and the chip may execute the steps of the above-mentioned MBMS receiving or sending method during running, and how to design and program the processor 501 is a well-known technology which will not be repeated here.

The embodiments of the present application further provides a non-transitory computer readable storage medium, which stores computer instructions, and when the computer instructions run on a computer, the computer is enabled to execute the steps of the above-mentioned MBMS receiving or sending method.

In some possible implementations, various aspects of the MBMS receiving or sending method provided by the present application may further be realized in the form of a program product, which includes a program code. When the program product runs on an electronic device, the program code is used for enabling a detection device to execute the steps in the MBMS receiving or sending method according to various exemplary embodiments of the present application described above in this specification.

Embodiments of the present application may be provided as methods, systems or computer program products. Therefore, the present application may take the form of full hardware embodiments, full software embodiments, or embodiments combining software and hardware aspects. Further, the present application may take the form of computer program products implemented on one or more computer usable storage media (including but not limited to a disk memory, a CD-ROM, an optical memory, etc.) containing computer usable program codes.

The present application is described with reference to flow charts and/or block diagrams of methods, devices (systems) and computer program products according to the present application. It should be understood that each flow and/or block in the flow charts and/or block diagrams and the combination of flows and/or blocks in the flow charts and/or block diagram can be realized by computer program instructions. These computer program instructions may be provided to a processor of a general-purpose computer, a special-purpose computer, an embedded processor or other programmable data processing devices to generate a machine, and an apparatus for realizing functions specified in one or more flows of the flow charts and/or one or more blocks of the block diagrams is generated by the instructions executed by the processor of a computer or other programmable data processing devices.

These computer instructions may also be stored in a computer-readable memory that can guide a computer or other programmable data processing devices to work in a specific mode, and the instructions stored in the computer-readable memory generate a manufactured product including an instruction apparatus, and the instruction apparatus realizes the functions specified in one or more flows of the flow charts and/or one or more blocks of the block diagrams.

These computer program instructions may also be loaded on a computer or other programmable data processing devices, and a series of operation steps are executed on the computer or other programmable devices to generate computer implemented processing. Therefore, the instructions executed on the computer or other programmable devices provide steps for realizing the functions specified in one or more flows of the flow charts and/or one or more blocks of the block diagrams.

What is claimed is:

1. A method for receiving a multimedia broadcast multicast service (MBMS), applied to a terminal, and comprising:
    determining a first MBMS to be initiated;
    determining a reliability requirement and a state instruction corresponding to the first MBMS according to a mapping relationship, wherein the mapping relationship comprises a mapping relationship between attribute information and the state instruction corresponding to the first MBMS: wherein the attribute information comprises a name of the first MBMS and the reliability requirement corresponding to the first MBMS; wherein the state instruction is configured for instructing the terminal to receive the first MBMS in a radio resource control (RRC) connected state or a non-RRC connected state;
    determining, by the terminal, whether the terminal is currently in the non-RRC connected state based on determining that the reliability requirement corresponding to the first MBMS is high and the state instruction corresponding to the first MBMS is configured for instructing the terminal to receive the first MBMS in the RRC connected state; and
    sending an RRC connection establishment request to a network device based on determining that the terminal is currently in the non-RRC connected state, wherein the RRC connection establishment request comprises first instruction information, and the first instruction information is configured for instructing that a cause for establishing a present connection is to receive the first MBMS.

2. The method according to claim 1, wherein the mapping relationship is carried in an MBMS control message received by the terminal; or the mapping relationship is pre-configured.

3. The method according to claim 1, wherein the mapping relationship further comprises: a mapping relationship among attribute information, the state instruction and a feedback instruction corresponding to the first MBMS.

4. The method according to claim 1, further comprising:
    receiving a configuration message sent by the network device and used for instructing the terminal to connect to the network device;
    connecting to the network device and entering the RRC connected state based on the configuration message; and
    receiving the first MBMS sent by the network device.

5. The method according to claim 4, wherein after receiving the first MBMS, the method further comprises:
    sending feedback information for instructing whether the terminal successfully receives the first MBMS.

6. The method according to claim 1, further comprising:
    receiving a retransmitted MBMS from the network device in response to a failure of reception of the first MBMS, wherein the retransmitted MBMS comprises an MBMS adjusted by the network device based on related information of the first MBMS.

7. The method according to claim 4, further comprising:
judging whether the terminal needs to feed back a receiving situation of the first MBMS according to the mapping relationship; wherein
after receiving the first MBMS, the method further comprises:
feeding back the receiving situation of the first MBMS to the network device in response to determining that the terminal needs to feed back the receiving situation of the first MBMS.

8. The method according to claim 1, wherein the non-RRC connected state comprises: at least one of an RRC idle state or an RRC inactive state.

9. A method for sending a multimedia broadcast multicast service (MBMS), applied to a network device, and comprising:
sending a mapping relationship to a terminal, wherein the mapping relationship is configured to determine a reliability requirement and a state instruction corresponding to a first MBMS by the terminal, wherein the mapping relationship comprises attribute information and the state instruction corresponding to the first MBMS, the attribute information comprises a name of the first MBMS and the reliability requirement corresponding to the first MBMS, and the state instruction is configured for instructing the terminal to receive the first MBMS in a radio resource control (RRC) connected state or a non-RRC connected state; and
receiving an RRC connection establishment request sent by the terminal, wherein the RRC connection establishment request comprises first instruction information, and the first instruction information is configured for instructing that a cause for the terminal to establish a present connection is to receive the first MBMS.

10. The method according to claim 9, wherein the mapping relationship is carried in an MBMS control message sent by the network device; or the mapping relationship is pre-configured.

11. The method according to claim 9, wherein the mapping relationship further comprises: a mapping relationship among attribute information, the state instruction and a feedback instruction corresponding to the first MBMS.

12. The method according to claim 9, further comprising:
sending a configuration message to the terminal, wherein the configuration message is configured to instruct the terminal to connect to the network device and enter the RRC connected state based on the configuration message; and
sending the first MBMS to the terminal.

13. The method according to claim 12, wherein after sending the first MBMS to the terminal, the method further comprises:
receiving feedback information sent by the terminal and used for instructing whether the terminal successfully receives the first MBMS.

14. The method according to claim 9, further comprising:
retransmitting an MBMS to the terminal in response to a failure of reception of the first MBMS, wherein the retransmitted MBMS comprises an MBMS adjusted by the network device based on related information of the first MBMS.

15. The method according to claim 12, wherein the mapping relationship further comprises a feedback instruction, and the feedback instruction is configured for instructing whether the terminal needs to feed back a receiving situation of the first MBMS.

16. The method according to claim 9, wherein the non-RRC connected state comprises: at least one of an RRC idle state or an RRC inactive state.

17. An electronic device, comprising:
a memory, configured to store program instructions; and
a processor, configured to call the program instructions stored in the memory and execute, according to the obtained programs, following steps:
determining a first multimedia broadcast multicast service (MBMS) to be initiated;
determining a reliability requirement and a state instruction corresponding to the first MBMS according to a mapping relationship, wherein the mapping relationship comprises a mapping relationship between attribute information and the state instruction corresponding to the first MBMS; wherein the attribute information comprises a name of the first MBMS and the reliability requirement corresponding to the first MBMS; wherein the state instruction is configured for instructing the terminal to receive the first MBMS in a radio resource control (RRC) connected state or a non-RRC connected state;
determining, by the terminal, whether the terminal is currently in the non-RRC connected state based on determining that the reliability requirement corresponding to the first MBMS is high and the state instruction corresponding to the first MBMS is configured for instructing the terminal to receive the first MBMS in the RRC connected state; and
sending an RRC connection establishment request to a network device based on determining that the terminal is currently in the non-RRC connected state, wherein the RRC connection establishment request comprises first instruction information, and the first instruction information is configured for instructing that a cause for establishing a present connection is to receive the first MBMS.

18. A non-transitory computer readable storage medium, wherein the computer readable storage medium stores a computer program, and the computer program comprises program instructions that, when executed by a computer, cause the computer to execute the method according to claim 1.

19. An electronic device, comprising:
a memory, configured to store program instructions; and
a processor, configured to call the program instructions stored in the memory and execute, according to the obtained programs, steps comprised by the method according to claim 9.

20. A non-transitory computer readable storage medium, wherein the computer readable storage medium stores a computer program, and the computer program comprises program instructions that, when executed by a computer, cause the computer to execute the method according to claim 9.

* * * * *